Dec. 23, 1941.  C. P. RICHINS  2,266,991
ANIMAL HOLDING APPARATUS
Filed Feb. 6, 1940  2 Sheets-Sheet 1
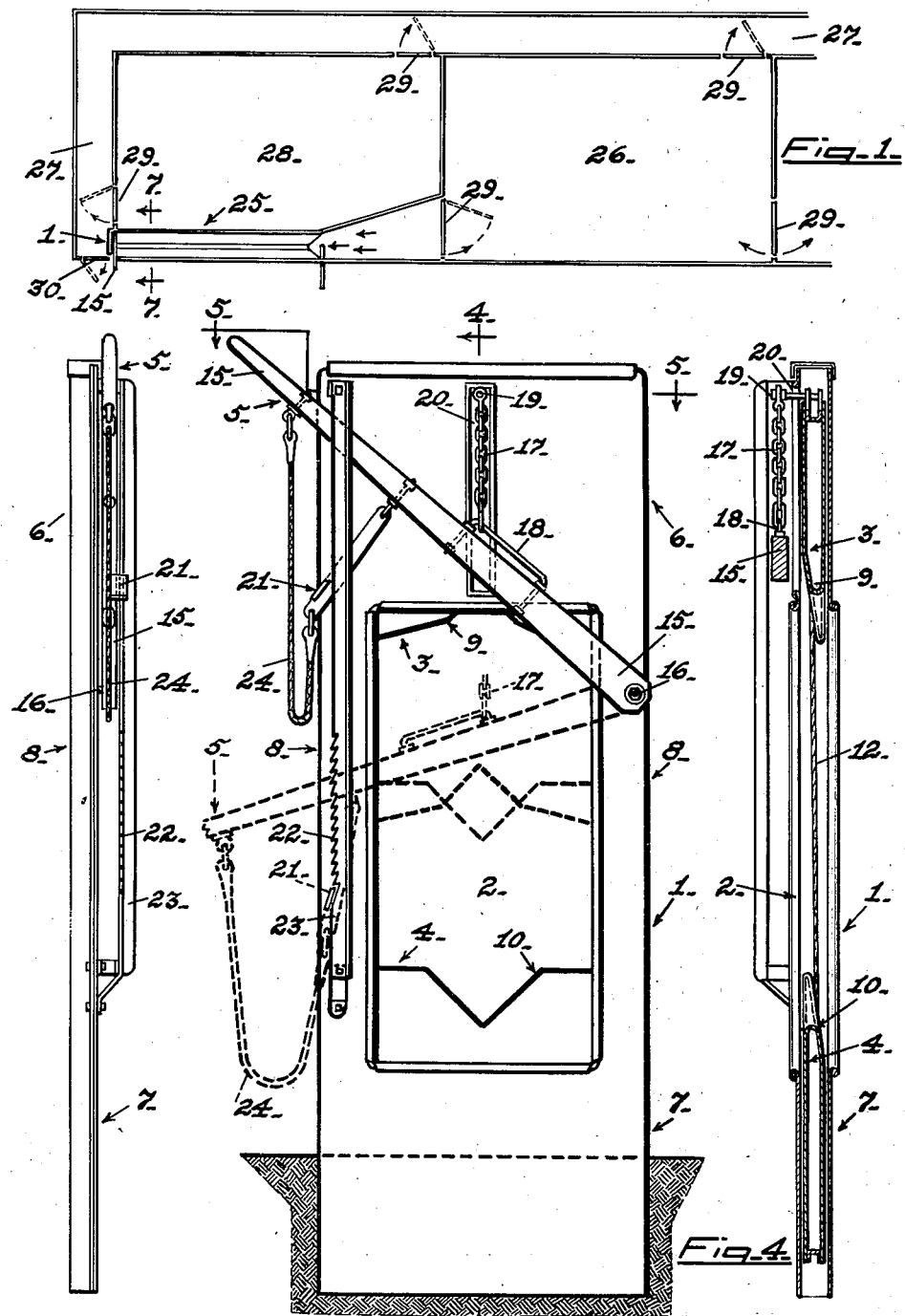
INVENTOR
Charles Parley Richins Dec. 23, 1941.  C. P. RICHINS  2,266,991
ANIMAL HOLDING APPARATUS
Filed Feb. 6, 1940   2 Sheets-Sheet 2
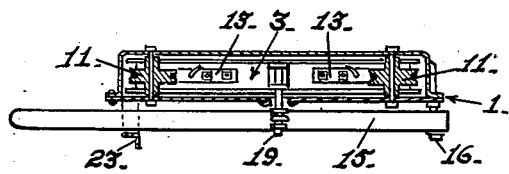
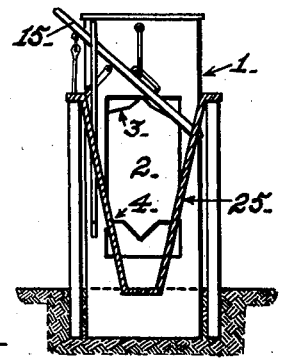
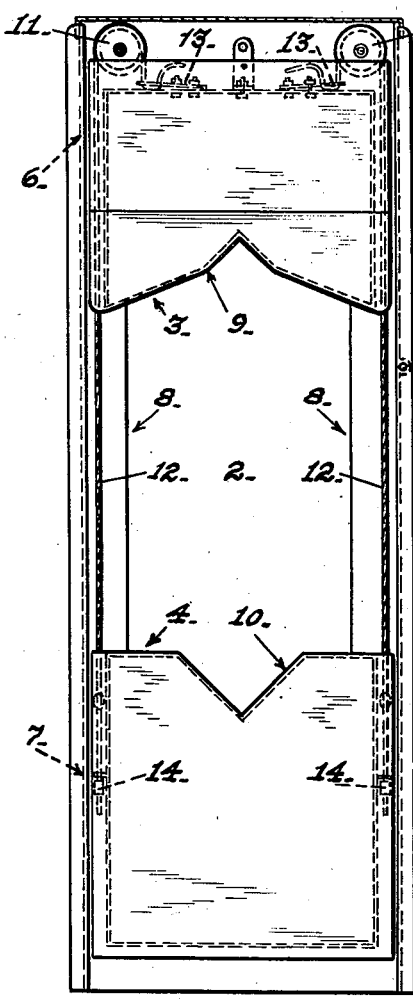
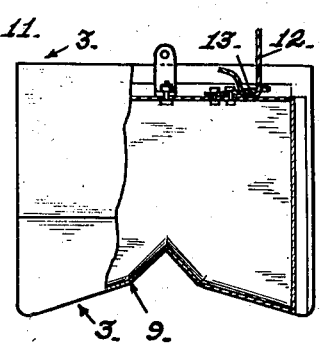
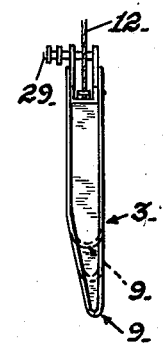
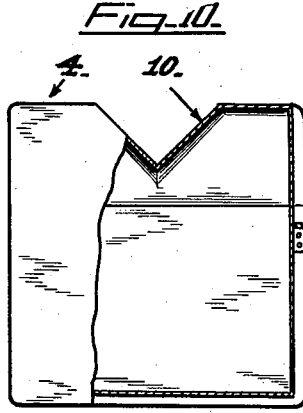
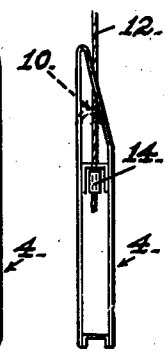
INVENTOR
Charles Parley Richins Patented Dec. 23, 1941

2,266,991

UNITED STATES PATENT OFFICE 2,266,991

ANIMAL HOLDING APPARATUS

Charles Parley Richins, Maywood, Calif.

Application February 6, 1940, Serial No. 317,556

7 Claims. (Cl. 119—98)

My invention relates to and has for an object the provision of a new and efficient apparatus for holding cattle and other animals in restraint for the purpose of dehorning, branding and otherwise treating them.

An object of my invention is to provide apparatus of the character described which will not injure the animals while restraining them in a manner best facilitating dehorning, branding and other treatment.

Another object is to provide in an apparatus of the character described a simply constructed and easily operable holding means which includes a body or frame having an opening or doorway therein accommodating the passage of an animal therethrough, and opposed yokes of novel construction movable into and out of position for closing said opening and embracing and holding the animal in a position such that it may be dehorned, branded or otherwise treated and then released.

A further object of my invention is to provide an apparatus of the character described which includes an especially constructed chute which is combined with the holding means in a novel manner whereby the animals may be readily and properly guided into position to be held by the yokes of said holding means without crowding, or allowing one animal to pass another.

Another purpose is to provide a novel arrangement of chute, pens and passages leading to and from the holding apparatus in such manner as to best permit of access to the animal while held for treatment, as well as to provide a safe place in which operator may work without being injured by the animal.

Yet another object is to provide an apparatus such as described in which a novel, simply constructed, and reliable operating means makes possible an easy and accurate movement of the animal restraining yokes into and out of restraining position as desired.

With the foregoing and other objects in view my invention consists in the construction, relative arrangement and combination of the parts and elements thereof as shown in the accompanying drawings, described in the following specification and finally set forth in the claims hereto appended. It is understood that I may make various minor changes as to shape, proportion and size of the parts and elements of my apparatus as desired without departing from the spirit and scope of the invention as hereinafter claimed.

Figure 1 is a schematic plan view showing one embodiment of my invention.

Figure 2 is a side elevation of the animal holding or restraining means.

Figure 3 is a rear elevation of the animal holding means as shown in Figure 2, showing the yokes retracted in full lines and extended in dashed lines.

Figure 4 is a vertical section taken on the line 4—4 of Figure 3.

Figure 5 is a cross section taken on the line 5—5 of Figure 3.

Figure 6 is a front elevation of the apparatus shown in Figure 3 with the rear sheet forming the body and the operating means for the yokes omitted, the yokes being shown in retracted position.

Figure 7 is a sectional view taken on the plane of line 7—7 of Figure 1.

Figure 8 is a fragmentary elevation of the upper yoke shown partly in section.

Figure 9 is an end elevation of the upper yoke.

Figure 10 is a fragmentary elevation of the lower yoke, partially in section.

Figure 11 is an end elevation of the lower yoke.

One embodiment of my invention as shown in detail in the accompanying drawings comprises an upright frame or body 1 having an opening or doorway 2 therein for accommodating the passage of cattle or other animals therethrough and in which the cattle or other animals may be releasably held one at a time. Opposed yokes 3 and 4 are mounted on the body 1 for movement into and out of position for closing the opening and embracing and holding an animal in restraint in the opening so that it may be dehorned, branded or otherwise treated without injury to the animal or the operator. A manually operable means 5 is provided for moving the yokes into and out of restraining position.

As here provided the body 1 is formed as a sheet metal housing having upper and lower sections 6 and 7 joined by channeled side portions 8, with the opening or doorway 2 defined between the sections and side portions. The yokes 3 and 4 are slidable into and out of housing sections 6 and 7 respectively, into position for freeing the doorway 2 as well as for closing it and holding an animal therein as indicated in Figure 3. The side edges of the yokes are slidably guided in the channeled side portions 8.

The upper yoke 3 is formed as a hollow sheet metal gate having an inverted substantially V shaped lower edge 9. This yoke is beveled or gradually reduced in thickness towards and is rounded at the edge 9 thereof so that it will closely conform to and engage the neck of an animal without injury thereto.

The lower yoke 4 is similarly formed as a hollow gate and has a V shaped notch 10 in its upper edge which latter is also beveled and rounded. As shown in dashed lines Figure 1, when the two yokes are extended they will overlap and lie close together due to the beveled edges and form a substantially diamond shaped opening while embracing the neck of the animal held thereby. Thus held, the animal cannot move past the body 1 and the head of the animal is disposed on one side of the yokes, while the body of the animal is on the other side of said yokes, whereby the animal may be dehorned, branded or otherwise treated and then released by retracting the yokes.

The operating means 5 as here employed includes pulleys 11, Figures 5 and 6, mounted on the upper section 6 of the body 1 and cables 12 fixed at their ends by means of the fastening devices 13 and 14 to the yokes 3 and 4 respectively and extended around said pulleys, so that when the upper yoke is extended downwardly the lower yoke will be lifted whereby the yokes will overlap as shown in dashed lines in Figure 3.

The fastening device 13 provides for adjusting the cables 12 whereby to regulate the strokes of the yokes to best restrain animals of different kinds and sizes. The cables lie in the channeled sides 8 so as to be out of the way.

A lever 15 is pivoted at one end at 16 on the body 1 and extends across said body so that the other end serves as a handle. A flexible element 17 is slidably connected at one end to a guide bar 18 on the lever and fixed at its other end to a bolt 19 on the upper edge of the upper yoke 3. The bolt 19 is movable in a slot 20 in the upper section 6 of the body 1.

The lower yoke 4 is heavier than the upper yoke 3 and consequently the lower yoke is normally in lowered and retracted position and through the cables 12 holds the upper yoke suspended in the housing section 6. This normally disposes the lever 15 in its up position as shown in Figures 2, 3 and 7.

When the lever is pulled downwardly, the flexible element 17 pulls the upper yoke downwardly and through the cables 12, the lower yoke is raised until the two yokes come into the desired position for embracing the animal and closing the passageway 2 in the body 1. By means of a pawl or catch member 21 pivotally connected with and depending from the lever 15 so as to contact ratchet teeth 22 on a bar 23 fixed to the body 1, the lever may be releasably held in such position as necessary to maintain the yokes in the desired animal holding position. A flexible element 24 is connected to the pawl at one end and at its other end to the lever 15, whereby to hang downwardly in a loop so that it may be readily pulled to lower the lever and subsequently used for disengaging the pawl from the ratchet teeth. When lever 15 is thus released the heavier lower yoke 4 will gravitate into its out-of-the-way position in the housing section 7 and thereby lift the upper yoke 3 into the housing section 6, so that the animal may pass freely through the doorway 2.

I may arrange the holding device of my invention in any suitable manner such that cattle and other animals may be releasably held one at a time for dehorning, branding or other purposes. However, the holding means may be used as shown in Figures 1 and 7 and this use takes into consideration the employment of a substantially V shaped animal chute 25 communicating at one end with an animal pen 26 and having the body 1 and associated parts mounted at and closing its other end. The chute is of such construction that the animals are driven single file to the holding device from the pen 26 and cannot crowd or pass one another. As an animal puts its head through the opening 2 in the body 1 as though to pass through said opening the operator pulls the lever 15 downwardly and the two yokes 3 and 4 come together around the neck of the animal, said yokes then being disposed as shown in dashed lines in Figure 3. In this manner the animal is held with its body in the V shaped chute and its head outside said chute. The animal may now be dehorned, branded, or otherwise treated while held in the chute and yokes. After the animal has been treated, the operator releases the lever and the yokes are retracted due to the gravitational return of the lower yoke to its out-of-the-way position. The opening 2 is now sufficiently cleared to allow the animal to pass therethrough. As shown in Figure 1 the released animal may enter a chute or passageway 27 and then pass back into the pen 28, or other pens, not shown, communicating with the chute 27. Suitable gates 29 may be provided as desired for controlling the segregation and penning up of the animals.

As the passageway 27 extends at right angles to and commences at the holding device of my invention it is provided with a gate 30 whereby the operator may step or reach into the passageway and have access to the head of the animal for dehorning or other treatment, the operator stepping out of the passageway and closing the gate when the animal is released. Access to the body of the animal is had through the usual spaces between the usual slats, bars or like parts for forming the V shaped chute, it being thought unnecessary to show the detailed construction of the chute.

It will now be seen that the apparatus hereinbefore described and as shown in the accompanying drawings constitutes one embodiment of my invention whereby the objects and advantages as set forth may be accomplished in a particularly efficacious manner.

I claim:

1. In combination, an animal chute through which animals may be driven in single file only, a body at the outlet end of the chute having an opening for accommodating the passage of animals therethrough one at a time, and opposed animal restraining yokes movable on the body into and out of position for holding an animal partly in the chute and partly in the opening, said yokes being mounted one above the other for movement towards and away from one another, and means for so moving said yokes.

2. An animal holding apparatus including an upright body having an opening therein through which an animal may pass, opposed animal restraining yokes mounted one above the other on said body for movement into and out of position for closing said opening and embracing the neck of an animal, said lower yoke being heavier than the upper yoke, means of operative connection between the body and said yokes whereby the heavier lower yoke will normally hold the yokes spaced apart to clear said opening, means for moving said yokes towards one another into position for closing the opening and embracing the neck of an animal, and means for releasably holding the yokes in animal holding position.

3. An animal holding apparatus comprising an upright body having an opening therein through which an animal may pass, and upper and lower animal restraining yokes slidable vertically on the body into and out of position for closing the opening and embracing the neck of the animal, said yokes being overlapped when embracing the animal, and also having beveled sides adjacent the neck engaging edges thereof and being rounded at said edges.

4. An animal holding apparatus comprising an upright body having an opening therein through which an animal may be driven, upper and lower yokes slidable on the body into and out of position for closing the opening and embracing the neck of an animal, pulleys on the body, cables mounted on said pulleys and secured at their ends to the upper and lower yokes respectively, the lower yoke being heavier than the upper yoke and operating to normally hold said yokes retracted from the opening, a lever pivoted on the body, a flexible element depending from said upper yoke and connected with the lever for pulling the upper yoke downwardly when the lever is moved downwardly, and latch means for releasably holding the lever in position to maintain the yokes in animal holding position.

5. Animal holding apparatus including a body having an opening accommodating the passage of an animal therethrough, and opposed yokes, means for substantially simultaneously sliding said yokes vertically on the body into and out of position for closing the opening and holding the animal, one of said yokes having an inverted V shaped edge extending substantially the full width of the yoke for embracing the neck of an animal and the other yoke having in one edge a V shaped notch of less width than said one edge for cooperation with the inverted V shaped edge for embracing the neck of the animal held by the yokes.

6. An animal holding apparatus including an upright body having a doorway therein through which an animal may pass, animal restraining yokes mounted on the body at the upper and lower ends of the doorway for movement into and out of position closing the doorway and holding an animal therein, said body including housings above and below the doorway for slidably receiving said yokes, and channeled side members extending between the housings at the sides of the doorway, said yokes being slidable in said channeled side members, and means providing for movement of said yokes into and out of position for closing the doorway and holding an animal therein.

7. An animal holding apparatus including an upright body having a doorway therein through which an animal may pass, animal restraining yokes mounted on the body at the upper and lower ends of the doorway for movement into and out of position closing the doorway and holding an animal therein, said body including housings above and below the doorway for slidably receiving said yokes, and channeled side members extending between the housings at the sides of the doorway, said yokes being slidable in said channel side members, and means providing for movement of said yokes into and out of position for closing the doorway and holding an animal therein, including pulleys mounted on the upper housing, cables mounted on said pulleys and secured at their ends to said yokes and movable in said channeled side members and housings, the lower yoke being heavier than the upper yoke for normally holding the yokes out of doorway closing and animal holding position, means operable on the body for pulling the upper yoke downwardly whereby the cables will raise the lower yoke and both yokes may be disposed in doorway closing and animal holding position, and means associated with the last named means for releasably holding the yokes in operative position.

CHARLES PARLEY RICHINS.